June 9, 1964 G. E. COMSTOCK 3D 3,136,465

TAPE BACK-SPACE DEVICE

Filed Dec. 20, 1961

INVENTOR
GEORGE E. COMSTOCK, 3d
BY
Douglas M. Clarkson
ATTORNEY

United States Patent Office 3,136,465 Patented June 9, 1964

3,136,465
TAPE BACK-SPACE DEVICE

George E. Comstock 3d, Huntington, N.Y., assignor to Potter Instrument Company, Inc., Plainview, N.Y., a corporation of New York
Filed Dec. 20, 1961, Ser. No. 160,713
10 Claims. (Cl. 226—95)

The present invention, generally, relates to tape transport apparatus, and more particularly, to a device for reducing interblock gaps between adjacent blocks of information being processed on a tape.

In digital magnetic tape transport apparatus, information is recorded usually in unit lengths called "blocks" along the tape, and adjacent blocks are separated by an unrecorded portion called the "interblock gap." The length of the gap is great enough to permit the tape to stop with the gap over the record-playback (R/P) head and, subsequentially, to achieve speed stabilization before recording (or playback) commences. Therefore, except for permitting stopping and starting of the tape between blocks of information, the interblock gaps represent wasted portions of the tape.

Accordingly, it is a principal object of the invention to provide means to shorten interblock gaps.

It also is an object of the invention to shorten interblock gaps without imposing programming restrictions on the operation of the system.

Briefly, tape handling apparatus in accordance with the invention provides means to backspace the tape a fixed and accurately repeatable distance. A specific form of a back-space device includes a tape loop-receiving cavity and a tape clamping means on each side of the cavity.

Figure 1:
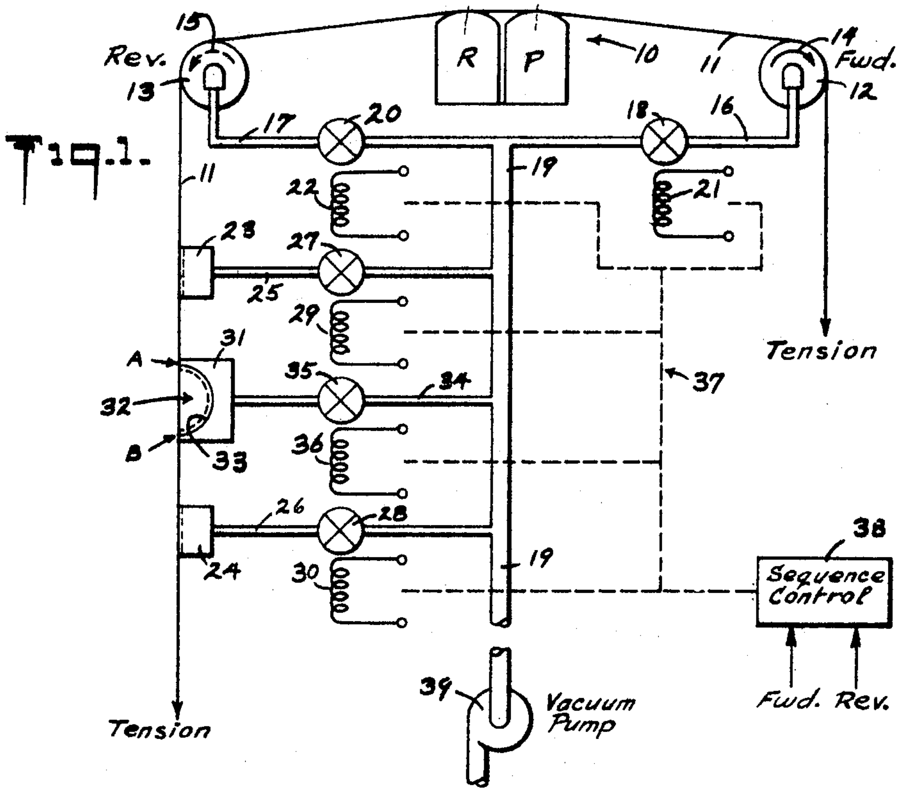

The above and other objects and advantages of the invention will become more apparent from the purview of the following detailed description taken in conjunction with the accompanying drawings, in which:

FIG. 1 is a diagrammatic view of tape transport components in accordance with the invention; and FIGS. 2–5 show illustrations of magnetic tape portions for purposes of the description which follows.

Referring now to FIG. 1 of the drawings, a record-playback head 10 is designated also with a capital letter "R" and a capital letter "P" indicating respectively the record and the playback sections of the head 10. A magnetic tape 11 is directed across the record-playback head 10 by means of suitable capstans 12 and 13.

The capstan 12, when connected to a driving source (not shown), is adapted to move the tape 11 in the direction of the arrow 14, and conversely, the capstan 13, when connected to a suitable power source (not shown), is adapted to move the tape 11 in the direction of the dotted arrow 15. For convenience in the description, the capstan 12 is legended in the drawing with the letters FWD. indicating an abbreviation of the word "forward," and the capstan 13 is legended with the capital letters REV. indicating an abbreviation for the word "reverse"; both of which are arbitrary designations.

While the capstans 12 and 13 may be any desired type, it is contemplated for the purposes of the description that these capstans 12 and 13 be of the vacuum-operated type. Therefore, a conduit 16 and a conduit 17 are shown connected axially to the capstans 12 and 13, respectively.

A valve 18 is placed in the conduit between the capstan 12 and a vacuum manifold 19, and a similar valve 20 is placed between the capstan 13 and the vacuum manifold 19, so that by actuating the valves 18 and 20, selectively, the vacuum source applied to the manifold 19 may be applied selectively to the capstans 12 and 13. For the purpose of this control, an electrical winding 21 is indicated adjacent the valve 18 as one means for operating the valve, and a similar electrical winding 22 is positioned adjacent the valve 20 for the same purpose.

The control for the respective valves 18 and 20 will be described in more detail presently.

Diverting the description momentarily, the numerals 23 and 24 indicate, respectively, vacuum clamping elements which, structurally, involve either a plurality of apertures in the surface across which the tape 11 passes or channels or other means by which the conduits 25 and 26, respectively, connect the vacuum manifold 19 to these clamping elements 23 and 24. A valve 27 is positioned in the conduit 25 between the vacuum clamping element 23 and the manifold 19, and a similar valve 28 is positioned between the vacuum clamping element 24 and the same vacuum manifold 19.

Therefore, by selectively controlling the valves 27 and 28, as by means of electrical windings 29 and 30, respectively, the application of a clamping vacuum to the elements 23 and 24 is controlled as desired. The control of these valves 27 and 28 will be described in more detail presently also.

Positioned intermediate the two vacuum clamping elements 23 and 24 is a housing 31 having a cavity indicated generally by the numeral 32, the dimensions of the cavity 32 being preselected carefully to provide the desired operation of the system, as now will be explained.

The distance between the points A and B as measured along the dotted line 33 following the contour of the cavity 32 is selected to be a desired amount greater than the straight line distance directly between the points A and B. Therefore, when a vacuum from the manifold 19 is applied through conduit 34 to the cavity 32, the tape 11 is pulled in to assume, substantially, the contour of the cavity, and therefore, an exactly determined linear length of tape is pulled in. A valve 35 with an associated electrical winding 36 permits selective application of the vacuum to the cavity 32.

The dotted lines indicated generally by the numeral 37 provide suitable electrical connections between the windings 21, 22, 29, 30 and 36 for connection to a sequence control circuit 38. The sequence control circuit 38 may assume any desired configuration to achieve selective operation of the electrical windings and may even be a manual control, if desired. Therefore, the valves 18, 20, 27, 28, 35 are selected in accordance with any desired program.

A vacuum pump 39, or any other suitable device, may be connected to the manifold 19 for providing a vacuum source.

Figure 2:
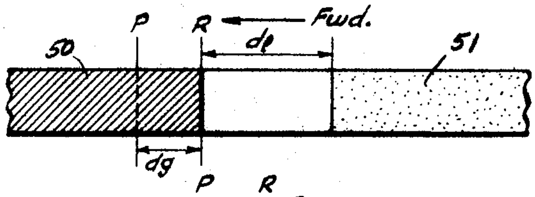

To operate the arrangement described above in accordance with the invention, reference is made to FIGS. 2, 3, 4 and 5. The line with the capital letter P indicates the physical position of the playback head, and the capital letter R indicates the physical position of the record head (see FIG. 1 also). The distance between the playback and record heads is designated $d_g$. In the position shown in FIG. 2, the block 50 is cross sectioned to indicate information having just been stored or written therein, and the position of the playback head, indicated by the letter P in FIG. 2, shows the lag distance which the playback head trails the record head for simultaneous checking. The arrow in FIG. 2 indicates the direction of motion of the tape.

The next block to be recorded will be that indicated by the numeral 51.

Figure 3:
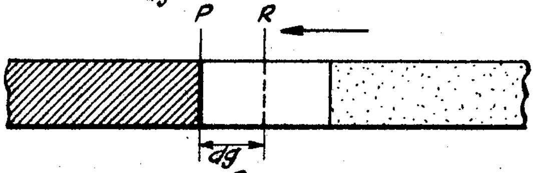

FIG. 3 shows the situation when the playback head has completed reading and checking the block 50, and the record head has moved a distance $d_g$ into the interblock gap designated by the distance $d_1$. Upon the detection of the end of the information block 50 at the read head R, the stop cycle is initiated, and motion ceases with the playback head P in the physical position shown in FIG. 4 of the drawings; i.e., a distance $d_s$ from the end of the information block 50. The total length of the interblock gap $d_i$, therefore, must be the sum of the distances $d_s$, $d_g$ and $d_w$, where $d_w$ is the distance the tape must travel from standstill before its initial velocity fluctuations are reduced sufficiently to permit writing again.

In calculating the interblock gap $d_i$, the worst case values must be assumed; i.e., $d_s$, $d_g$ and $d_w$ being at the upper limits of their respective tolerances. Typically, for a tape system operating at 100 i.p.s., inches per second, $d_s$ and $d_w$ may be on the order of 0.125 inch ($\pm$.050 inch each), and $d_g$ frequently is 0.3 inch. Thus, the interblock gap often is found to be in the order of ¾ inch.

Figure 5:
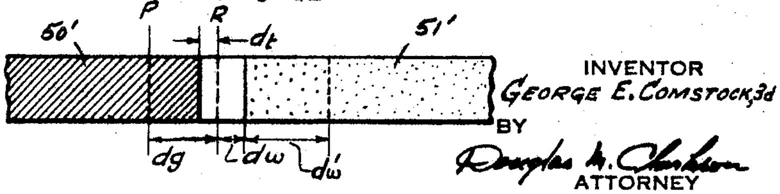

However, back spacing in accordance with the present invention is used to shorten the interblock gap, and FIG. 5 illustrates the position of the playback and the record heads when the tape has been back spaced so that the record head is a distance $d_t$ from the end of the information block 50', just written. The distance $d_t$ may be just large enough to prevent the record head from re-entering the block 50' if it is desired to be safe from accidental erasure of part of the block 50' due to an accidental turning on of the record head.

Figure 4:
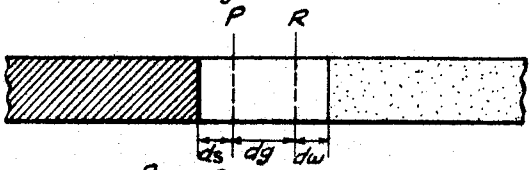

Now, with the tape back spaced and in the position illustrated in FIG. 5, the interblock gap is the sum of the distance $d_w+d_t$, which may be on the order of ½ of the interblock required in FIG. 4. The block 51' is recorded by starting up the tape from the position shown in FIG. 5 and commencing recording at a time corresponding to the same distance $d_w$ indicated in FIG. 4. The distance $d_w'$ indicates the amount of reduction in the gap.

To achieve the back space desired as described above, the operation of the arrangement shown in FIG. 1 will be described. Assume that the tape has just completed a record cycle for a block such as a block 50 shown in FIG. 2, and the tape has come to rest in a position such as shown in FIG. 4 with both the playback and record heads as indicated by the respective lines P and R in FIG. 4.

As part of the stopping of the tape 11, the sequence control circuit 38 would apply appropriate signals to the electrical windings 21 and 22 to close the valve 18 and 20, removing the vacuum source from the capstan 12, the valve 20 being already closed since the capstan 13 is not driving the tape in this instance. A further signal from the sequence control circuit 38 is applied to the electrical winding 30 to open the valve 28 so that the vacuum clamping element 24 grips the tape 11.

With the tape 11 gripped at the clamping element 24, the electrical winding 36 is energized opening the valve 35 to pull the tape into the chamber 32. Since the tape is clamped at the element 24, the tape would be pulled back across the record-playback head 10 to obtain the length necessary to follow the accurately predetermined length of the dotted line 33 within the cavity 32. By this means, the tape is pulled back a fixed and accurately determined distance across the head 10 and will assume a position such as shown in FIG. 5 relative to the playback and record head.

The next step in this sequence is to energize the electrical winding 29 to open the valve 27 thereby activating the vacuum clamping element 23 to grip the tape 11. Then, the valve 28 is closed to release the tape at the clamp 24 and the valve 35 is closed to release the tape in the cavity 32, whereupon the tension (not shown but indicated by legend in FIG. 1) causes the tape 11 to pull out of the cavity 32, pass across the element 24 and come taut. With the tape once again taut, the valve 27 is closed to release the clamping element 23 and the tape, once it is back spaced to the position shown in FIG. 5 is released without further movement across the head 10.

Of course, back spacing in the opposite direction may be achieved in accordance with the invention. For example, assume that the tape 11 is being driven in the opposite direction from that described above. That is, the capstan 13 is supplied with vacuum from the manifold 19 by the valve 20 being opened, and the tape 11 is driven by the capstan 13 which is rotating in the direction of the arrow 15. Upon stopping the tape 11 then, it will be desired to back-space the tape with the same cavity 32 but in the opposite direction from that described previously above.

Therefore, with the tape 11 stopped, the vacuum clamping element 23 is activated by a programmed sequence control in the circuit 38 which energizes the electrical winding 29 to open the valve 27. With the tape 11 gripped by the vacuum clamping element 23, the valve 35 is open so that the vacuum draws the tape 11 into the cavity 32 similarly as that described above.

While the tape is held within the cavity 32, the valve 28 is opened and the vacuum clamping element 24 grips the tape, and the valve 27 now is closed so that the vacuum clamping element 23 will release the tape. The tension at the opposite end of the tape, indicated to the right in FIG. 1 by the legend "Tension," now will pull the tape out of the cavity 32 until it stretches taut between the points A and B.

By this means, the tape has been back-spaced in the opposite direction by the same two vacuum clamping elements 23 and 24 and the same cavity 32 as that used to back space the tape in the first described direction. Therefore, with the arrangement in accordance with the invention, a magnetic tape may be back spaced an accurately fixed amount each time and in either direction in accordance with a desired program.

Obviously many modifications and variations of the present invention are possible in the light of the above teachings. Therefore, it is to be understood that the invention is not limited in its applications to the details of construction and arrangement of parts specifically described or illustrated and that within the scope of the appended claims it may be practiced otherwise than as specifically described or illustrated.

What is claimed is:

1. A tape handling apparatus having a tape under tension for process information, comprising,
   - transducer means past which a tape is adapted to be moved to effect a transfer of information,
   - tape drive means adjacent said transducer means to move a tape in a predetermined direction,
   - back-space means including a tape loop-receiving cavity and including tape clamping means on opposite sides of the tape loop-receiving cavity to move a tape past said head in a direction opposite said predetermined direction only a limited distance to provide interspace gap between blocks of information on a tape which is reduced an amount determined by said back-space means, and
   - means to connect a vacuum source selectively to said tape clamping means and said tape loop-receiving cavity to effect said back-spacing.

2. In tape handling apparatus as set forth in claim 1 wherein said means to connect a vacuum source includes an electrical switching means for connecting the vacuum source selectively to said clamping means and said tape loop-receiving cavity.

3. In tape handling apparatus as set forth in claim 1 wherein said means to connect a vacuum source selectively includes a valve means adjacent each of said tape clamping means,
   - and a control means to coordinate the actuation of said valve means selectively.

4. In tape handling apparatus as set forth in claim 1 wherein said tape drive means includes a vacuum capstan, and means to control the connection of a vacuum source thereto in a predetermined sequence relative to the actuation of said back-space means.

5. In tape handling apparatus as set forth in claim 1 wherein said tape drive means includes a first vacuum capstan on one side of said transducer means, a second vacuum capstan on the opposite side of said transducer means from said first capstan, and means including an electrically operable valve to connect each of said vacuum capstans selectively to a vacuum source to drive a tape in a predetermined direction.

6. A tape handling apparatus having a tape under tension for processing information, comprising transducer means passed which a tape is adapted to be moved to affect a transfer of information, tape drive means adjacent said transducer head to move a tape in a predetermined direction, a tape loop-receiving arcuate cavity positioned for a tape to travel thereacross during normal operation of the apparatus, the distance along the surface of said arcuate cavity less the chordal distance across said cavity being less than the length of the normal interspace gap between blocks of information contained on a tape, tape clamping means on opposite sides of said loop-receiving cavity to hold a tape first on one side of said cavity and then on the opposite side to affect back-space of the tape by a predetermined distance, vacuum means for causing the tape to move into the cavity and to cause the tape clamping means to hold the tape, means to connect said vacuum means to a vacuum source, and sequence control means for operating said vacuum means in accordance with a predetermined schedule to affect the back-spacing of the tape.

7. In tape handling apparatus as set forth in claim 6 wherein said cavity and said tape clamping means are electrically controlled vacuum means including means to connect with a vacuum source.

8. In tape handling apparatus as set forth in claim 7 including means to connect said cavity and said tape clamping means to a vacuum source, electrically operated valves and connection means between said cavity and each of said tape clamping means and a vacuum source, and control means to control the actuation of said valves in a predetermined sequence.

9. In tape handling apparatus as set forth in claim 8 wherein said tape drive means is a vacuum capstan including electrically operable connection means connected with said control means.

10. A magnetic tape transport device having a magnetic tape under tension for processing information, comprising a dual, record-playback transducer head, a vacuum tape-drive capstan on opposite sides of said head, one capstan being adapted to drive a magnetic tape in a forward direction across the head and the other capstan being adapted to drive said tape in a reverse direction, a single vacuum manifold adapted to be connected to a vacuum source, first connection means to connect each of said vacuum capstans selectively to said vacuum manifold, means to define a tape loop-receiving cavity on one side of said transducer head, second connection means to connect said loop-receiving cavity with said vacuum manifold, a vacuum tape-clamping means on each side of said loop-receiving cavity, valve means to connect said tape-clamping means selectively to said vacuum manifold, and means to control the selection of said capstans, loop-receiving cavity and tape-clamping means in a predetermined sequence to affect a back-spacing of a magnetic tape.

References Cited in the file of this patent

UNITED STATES PATENTS

| | | |
|---|---|---|
| 2,553,410 | Handschin | May 15, 1951 |
| 2,778,634 | Gams et al. | Jan. 22, 1957 |
| 2,892,379 | Cooper | June 30, 1959 |
| 2,900,132 | Burns et al. | Aug. 18, 1959 |
| 2,954,911 | Baumeister et al. | Oct. 4, 1960 |
| 2,975,407 | O'Brine | Mar. 14, 1961 |